United States Patent
Gunderson

(10) Patent No.: US 7,488,005 B2
(45) Date of Patent: Feb. 10, 2009

(54) QUICK CONNECTOR FOR HIGH PRESSURE APPLICATIONS

(75) Inventor: Stephen H. Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 443 days.

(21) Appl. No.: 11/218,666

(22) Filed: Sep. 2, 2005

(65) Prior Publication Data

US 2006/0082149 A1    Apr. 20, 2006

Related U.S. Application Data

(60) Provisional application No. 60/609,399, filed on Sep. 13, 2004.

(51) Int. Cl.
  F16L 39/00    (2006.01)
  F16L 21/00    (2006.01)
  F16B 7/00     (2006.01)

(52) U.S. Cl. .................. 285/319; 285/305; 285/322; 285/323; 285/324; 403/290; 403/298

(58) Field of Classification Search ........... 285/319, 285/305, 323, 322, 324; 403/286, 290, 298
See application file for complete search history.

(56) References Cited

U.S. PATENT DOCUMENTS

| | | | |
|---|---|---|---|
| 2,272,811 A * | 2/1942 | Nathan | ............ 277/619 |
| 4,650,223 A | 3/1987 | Miyazaki et al. | |
| 4,681,351 A | 7/1987 | Bartholomew | |
| 4,846,506 A | 7/1989 | Bocson et al. | |
| 4,925,217 A * | 5/1990 | Ketcham | ............ 285/93 |
| 4,948,175 A | 8/1990 | Bartholomew | |
| 4,948,176 A | 8/1990 | Bartholomew | |
| 5,044,675 A | 9/1991 | Sauer | |
| 5,064,227 A | 11/1991 | Spors et al. | |
| 5,067,754 A | 11/1991 | Bartholomew | |
| 5,131,691 A | 7/1992 | Washizu | |
| 5,195,787 A | 3/1993 | Bartholomew | |
| 5,219,188 A | 6/1993 | Abe et al. | |
| 5,423,577 A | 6/1995 | Ketcham | |
| 5,542,717 A | 8/1996 | Rea | |
| 5,573,279 A | 11/1996 | Rea et al. | |
| 5,626,371 A | 5/1997 | Bartholomew | |
| 5,752,726 A | 5/1998 | Fixemer | |

(Continued)

FOREIGN PATENT DOCUMENTS

EP    0566889 A1    10/1993

(Continued)

*Primary Examiner*—James M Hewitt
*Assistant Examiner*—Jay R Ripley
(74) *Attorney, Agent, or Firm*—Leydig, Voit & Mayer, Ltd.

(57) ABSTRACT

A quick connector coupling assembly to connect a rigid tube to a hollow body component. A retainer releasably retains the tube within a bore in the body. A resilient seal member surrounds the tube and creates a fluid tight seal against the tube and the body defining the bore. A seal member retainer interposed between the seal member and the body transfers axial load on the seal due to pressure to the body. In one embodiment a polyfluoroethelene spacer is interposed between the seal member and the seal member retainer.

24 Claims, 5 Drawing Sheets

U.S. PATENT DOCUMENTS

| | | | |
|---|---|---|---|
| 5,897,145 A * | 4/1999 | Kondo et al. ............... 285/93 |
| 5,931,510 A | 8/1999 | Mathew et al. |
| 6,079,750 A | 6/2000 | Kacines |
| 6,086,119 A | 7/2000 | Hansel |
| 6,152,496 A | 11/2000 | Kouda |
| 6,173,998 B1 | 1/2001 | Bock |
| 6,186,561 B1 | 2/2001 | Kaishio |
| 6,189,199 B1 | 2/2001 | Ouchi et al. |
| 6,279,966 B1 | 8/2001 | Kondo et al. |
| 6,390,511 B1 | 5/2002 | Kargula |
| 6,481,758 B1 | 11/2002 | Andre et al. |
| 6,536,807 B1 | 3/2003 | Raymond et al. |
| 6,540,264 B1 | 4/2003 | Yokoyama et al. |
| 6,550,815 B2 | 4/2003 | Zitkowic, Jr. et al. |
| 6,857,663 B2 | 2/2005 | Nagata et al. |
| 6,857,667 B2 | 2/2005 | Malone |
| 6,883,779 B2 * | 4/2005 | Borgmeier et al. ....... 251/149.6 |
| 6,938,651 B1 | 9/2005 | Carter et al. |
| 2003/0168856 A1 | 9/2003 | Kaminski et al. |
| 2003/0184089 A1 | 10/2003 | Takayanagi et al. |
| 2005/0221679 A1 | 10/2005 | Takayanagi |

FOREIGN PATENT DOCUMENTS

| | | |
|---|---|---|
| EP | 0971163 A2 | 1/2000 |
| EP | 1 445 527 A1 | 8/2004 |
| GB | 2240148 A | 7/1991 |
| GB | 2240150 A | 7/1991 |

* cited by examiner

QUICK CONNECTOR FOR HIGH PRESSURE APPLICATIONS

This application claims the benefit, pursuant to Title 35 U.S.C. §119 of provisional application Ser. No. 60/609,399 filed Sep. 13, 2004, the content of which is hereby incorporated by reference.

BACKGROUND OF THE INVENTION

This application relates to coupling assemblies, and more particularly to a quick connector of the type for connecting a male member formed at the end of a tube into a bore in a connector body for high pressure applications.

In the automotive and other fields, one type of coupling assembly often utilized to provide a fluid connection between two components or conduits are quick connectors, which generally include a male member received and retained in a female connector body. Use of a quick connector is advantageous in that a sealed and secured fluid line may be established with minimum amount of time and expense.

A retainer is often used to secure the male member within the connector body. One such type of retainer includes a plurality of locking members which extend between a radially enlarged upset formed on the male member and an annular face defined in the connector body. The abutment of the retainer with the upset of the male member at one end and the annular face of the connector body at the other end prevents the withdrawal of the male member from the connector body. This type of retainer is prevalent in the art and has proven effective in many fluid line applications.

A seal member, usually in the form of an O-ring seal, is used with a quick connector coupling to create a fluid tight seal between the male member and the connector body. In such a configuration, the O-ring is located axially inwardly of the retainer and separated by an annular spacer slidably mounted on the male member. It is often held against axial load imparted by fluid pressure by a spacer that is press fit, or in a snap fit relation to the bore in which it is received. Since the retainer is somewhat flexible, and the O-ring is slidably linked with the retainer, the O-ring is able to slide slightly relative to the male member. Also, such quick connector assemblies are often used in applications where the components are subject to high pressure and temperature, as well as vibration and cyclic application of pressure. These conditions increase the difficulty of maintaining a fluid tight joint. In high pressure applications such as automotive brake systems, it is necessary to ensure that the axial force imparted to the components be reliably accommodated.

The present invention incorporates a separate retainer engaged with the connector body to receive axial load imparted to the seal member by fluid pressure. In one embodiment, an additional spacer made of polytetrafluoroethelene polymer located between the seal member and the sleeve is used to minimize the effects of vibration and cyclic load.

DETAILED DESCRIPTION

Figure 1:
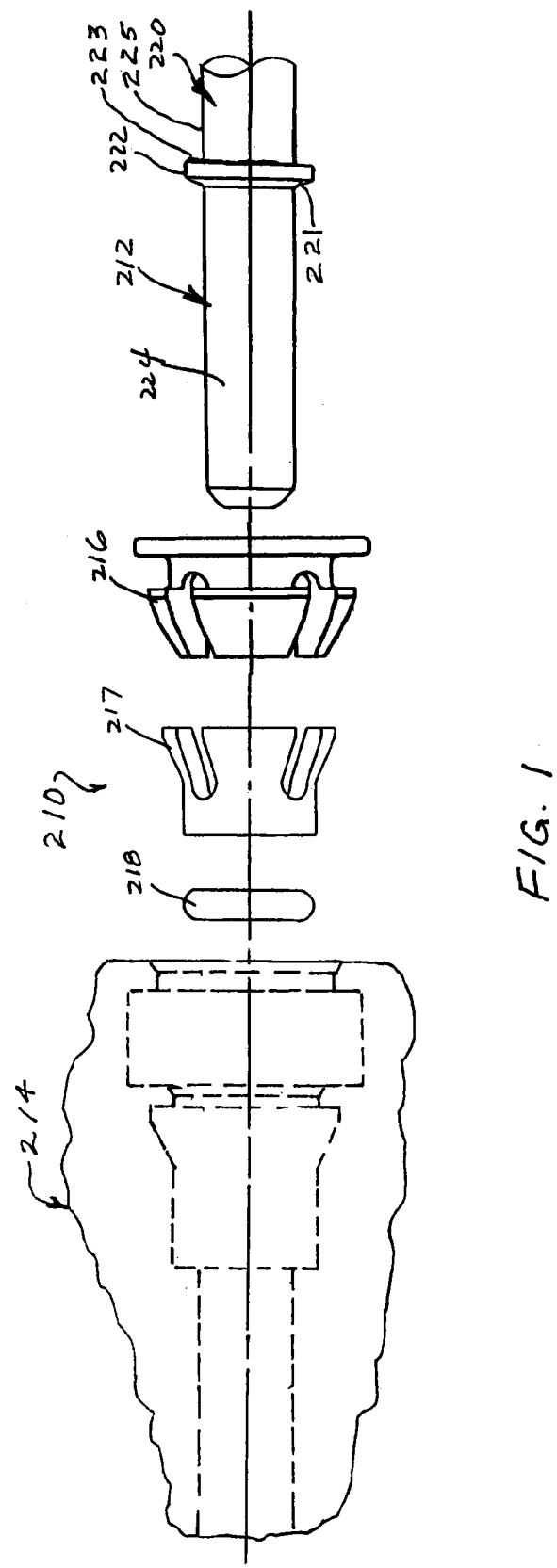
FIG. 1 is an exploded view of a fluid quick connector coupling assembly in accordance with the present invention.

An embodiment of a fluid coupling assembly in accordance with the present invention is illustrated in FIGS. 1-11. The quick connector fluid coupling assembly 210 comprises a male member 212, a hollow female connector body 214, a retainer 216 for securing the male member 212 within the connector body 214, a sealing member 218, and an outer spacer or seal member retainer 217.

The male member 212 is formed by the end of a hollow rigid tube 220. The tube 220 may lead to a component in a fluid line system, or may itself be a portion of a component in a fluid line system. The male member 212 includes a radially enlarged annular upset 222 spaced from the free or terminal end of the tube. It has a forward facing generally radial annular surface 221 and rearward facing generally radial annular surface 223. The male member 212 has a cylindrical portion 224 between the upset 222 and the free end of the tube. A cylindrical portion 225 of the tube extends rearward beyond upset 222 may be coated with Nylon to provide corrosion protection for the remaining length of the tube 220. The coating is removed from the surface 224 from the free end of the tube to the rearward facing surface 223 of upset 222.

Figure 2:
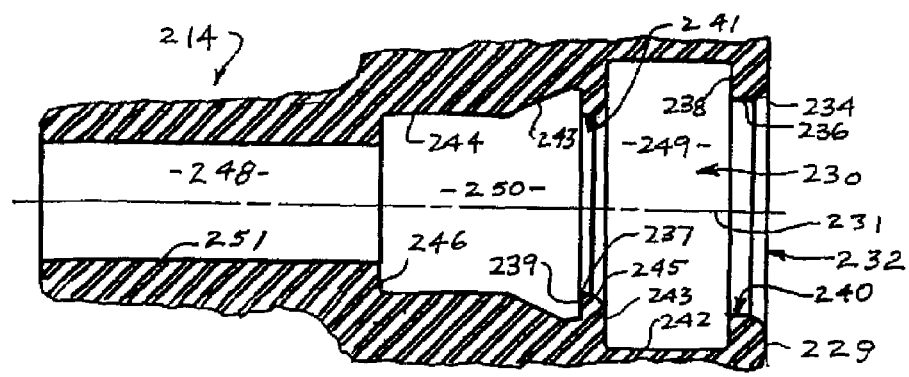
FIG. 2 is sectional side view of the connector body of the quick connector coupling assembly illustrated in FIG. 1.

The connector body 214 is illustrated in FIG. 2. The connector body 214 is a component of a high pressure fluid system such as a vehicular brake system. The component may be a master cylinder, brake cylinder or brake caliper or other system component. It could, of course, be any body that is configured with a cavity to receive the coupling assembly components and male member. It could also be a body configured with threads to attach to another system component. It could include a stem end, for example, to attach to a flexible hose which is part of a fluid system.

As illustrated in FIG. 2, the connector body 214 is hollow and defines an axial tube, seal and retainer receiving bore 230 extending axially forward from an entrance opening 232 formed in planar wall 229 of body 212. The bore 230 is symmetrical about centerline 231. The bore 230 is divided into three portions: a retainer receiving portion 249, a seal receiving portion 250, and a reduced diameter tube receiving portion 248. The latter portion defines a fluid passage 251 in communication with the interior of body 214.

With regard to connector body 214 the term forward means toward passage 251 from entrance opening 232 and the term rearward means toward entrance opening 232 from passage 251. The term inner or inward means radially toward the centerline 231 and outer or outward means radially away from centerline 231.

Entrance opening 232 is defined by an axially extending cylindrical surface 236 through which the retainer 216 and male member 212 to be placed within bore 230 must pass. Chamfer 234 intersects planar wall 229 of body 214 and axially extending cylindrical surface 236. It facilitates insertion of the retainer 216 into the connector body 214

Forward of axially extending cylindrical surface 236 is a radially directed annular abutment or locking surface 238 within retainer receiving portion 249 of bore 230. The surface 238 serves as an abutment or locking surface to retain the retainer 216 within the bore 230 which, in turn, releasably retains the male member 212 in fluid tight relation with body 214. Planar wall 229, chamfer 234, axially extending cylindrical surface 236 and radially directed annular locking or abutment surface 238 define a rim 240 at entrance opening 232 of bore 230. Axially extending cylindrical surface 236 defines the radial inner surface of rim 240.

Axially forward of the locking surface 238 is an enlarged diameter cylindrical surface 242 followed by a forward radially directed annular surface 243. The radially directed annular locking surface 238, forward radially directed annular surface 243 and enlarged diameter cylindrical surface 242 define the retainer receiving portion 249 of bore 230.

Forward of the radially directed annular surface 243 is an intermediate axially extending cylindrical surface 237 that has a diameter slightly larger than the outer diameter of upset 222 of male member 212. Radially directed annular surface 243 and intermediate axially extending cylindrical surface 237 are intersected by chamfer 245. The chamfer aids in insertion of seal and retaining components into bore 230 during assembly.

Inward of axially extending cylindrical surface 237 is a radially extending annular seal member retention surface 239. Conical surface 243 converges forward from seal member locking surface 239 and merges with axially extending cylindrical sealing surface 244. Radially directed annular surface 243, chamfer 245, intermediate axially extending cylindrical surface 237, and radially extending annular seal member retention surface 239 define rib 241 the radially inner cylindrical surface of which is cylindrical surface 237.

Cylindrical sealing surface 244 has a diameter slightly smaller than the outer diameter of seal member 218 extends from its merger with conical surface 243 forward to forwardmost radial annular surface 246. The seal receiving portion 250 of bore 230 is defined by radially extending annular seal member retention surface 239, conical surface 243, axially extending cylindrical sealing surface 244 and forwardmost radially directed annular surface 246.

Axially forward from forwardmost radial annular surface 246 is cylindrical passage 251 which defines the reduced diameter tube receiving portion 248 of axial bore 232. It is sized to closely overlie the outer cylindrical portion 224 of the male member 212 to coaxially pilot the male member 212 within bore 230. Also cylindrical passage 251 communicates fluid within the system to the interior of the body component 214.

Figure 3:
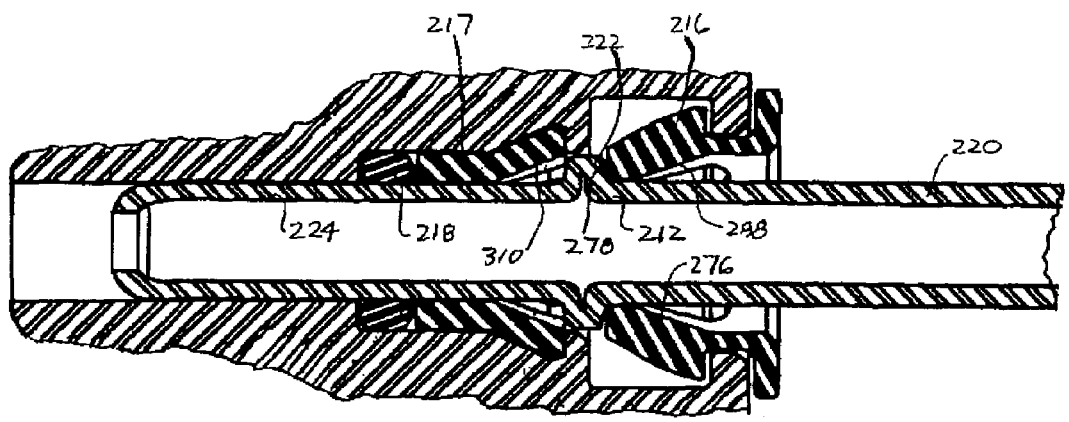
FIG. 3 is a cross-sectional assembly view through the quick connector coupling illustrated in FIG. 1.
Figure 4:
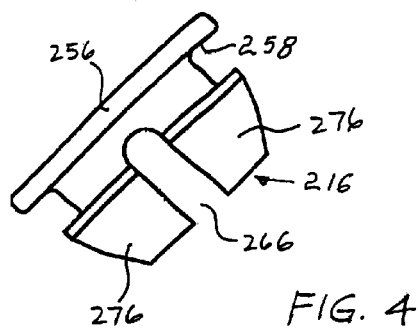
FIG. 4 is a perspective view of the retainer of the quick connector coupling illustrated in FIG. 1.
Figure 5:
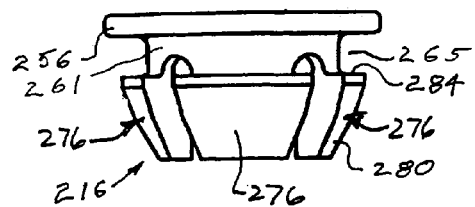
FIG. 5 is a side view of the retainer illustrated in FIG. 4.

Referring to FIG. 3, sealing member 218 provides a seal between cylindrical surface 244 of the bore 230 of connector body 214 and the outer cylindrical surface 224 of male member 212. It resides forward of spacer or seal member retainer 217 within seal receiving portion 250 of bore 230 defined by cylindrical surface 244.

Seal member 218 is an annular, elastomeric O-ring that surrounds cylindrical surface 224 of tube 220 between its free end and upset 222 and provides fluid tight joint between the cylindrical seal surface 244 and the cylindrical portion 224 of male member 212. The outer diameter of the O-ring 218 is slightly larger than the diameter of the cylindrical seal surface 244. The inner diameter of O-ring 218 is slightly smaller than the diameter of cylindrical portion 224 of male member 212. When the fluid system is under pressure, the O-ring creates a fluid tight seal against these surfaces, as well as, against seal member retainer 217, as will be explained.

The retainer 216 is illustrated in FIGS. 4-7. The retainer 216 includes a cylindrical ring 256 at a first axial end. The ring 256 has a forward facing radial surface 258, a rearward facing radial surface 260 and a reduced diameter cylindrical portion 261 defining an outer surface 262 and an inner cylindrical surface 263. A bore 264 is defined by the ring 256.

Four duckbill shaped flexible locking arms 276 extend axially forward and radially inward from reduced diameter cylindrical portion 261 of the ring 256. Four axially extending elongated slots 266 between each of the adjacent arms 276 separate the arms and extend from the free end into reduced diameter cylindrical portion 261 of the ring 256. The slots 266 allow the arms 276 to flex radially relative to the ring 256 in the area of the reduced diameter cylindrical portion 261.

Each arm 276 has a front abutment surface 278 at its free end, a top ramped surface 280 and a rear abutment surface 284 adjacent its connection to reduced diameter cylindrical portion 261. Each arm 276 has a ramped interior surface 288, and a cylindrical bottom surface 290 adjacent the free end. The forward facing surface 258 of the ring 256, the reduced diameter cylindrical portion 261 of the ring 256, and the rear abutment surfaces 284 of the arms 276 define a channel 265. The channel 265, and thus the reduced diameter portion 261, are configured and sized to allow cylindrical surface 236 of rim 240 of the connector body 214 to be situated and retained in the channel 265 with the rear abutment surfaces 284 of arms 276 in facing abutting relation to radial annular abutment surface 238 within bore 230.

The spacer or seal member retainer 217 is illustrated in FIGS. 8-11. The seal member retainer 217 includes an annular ring 292 at a first axial end. The ring 292 has a forward facing abutment surface 294. A bore 298 is defined in the ring 292. Four legs 300 extend axially rearward and radially outward from the rear of the ring 292. Four axially extending elongated slots 302 are defined between each of the adjacent legs 300 and extend from the second axial end to the ring 292. The slots 302 allow the legs 300 to flex radially relative to the ring 292. Each leg 300 has a ramped top surface 304, a rear abutment surface 308, and a conical bottom surface 310.

To form the connection as illustrated in FIG. 3, the O-ring 218 is positioned within the seal receiving portion 250 of the connector body 214. The seal ring is disposed within cylindrical sealing surface 244 adjacent forwardmost radial annular surface 246. The seal member retainer 217 is inserted into the seal receiving portion 250 of the connector body 214 to retain the seal member 218 in place. As the seal retainer 217 is inserted axially forward into the connector body 214, the ramped top surface 304 of each leg 300 contacts chamfer 234 and axially extending cylindrical surface 236 of rim 240 at entrance opening 232 of connector body 214. Forward insertion of the seal retainer 217 causes the legs 300 to flex radially inward relative to the cylindrical surface 236. After the legs 300 have surpassed the surface 236 at the entrance opening, the legs 300 spring radially outward within the retainer receiving portion 249 of the connector body 214.

Continued forward insertion of the seal retainer 217 causes the ramped top surface 304 of each leg 300 to contact the chamfer 245 and intermediate axially extending cylindrical surface 237 at rib 241. The legs 300 flex radially inward relative to the annular ring 292. After the legs 300 have surpassed intermediate cylindrical surface 237 the legs 300 spring radially outward within the seal receiving portion 250 to a position with the ramped top surfaces 304 of legs 300 located in closely spaced facing relation to the conical surface 243 of the connector body 214 with the rear abutment surfaces 308 of legs 300 in abutting facing relation with the radially directed annular seal member retaining surface 239.

In this position, the seal retainer 217 is constrained radially and axially within the seal receiving portion 249 of the connector body 214. The ring 292 of retainer 217 is disposed within cylindrical sealing surface 244 in closely spaced piloting or surrounding relation. The ramped top surfaces 304 of legs 300 abut the conical surface 243 to hold the spacer 217 against axially forward movement. The rear abutment surfaces 308 of the legs 300 abut the radially extending annular seal member retaining surface 239 and hold the seal retainer 217 from moving axially rearward.

With the seal retainer 217 inserted into the seal receiving portion 249 of the connector body 214, the O-ring 218 is constrained within the seal receiving portion 249 of the connector body 214. The outer diameter surface of the O-ring 218 contacts the cylindrical sealing surface 244 of the connector body 214 and is slightly compressed against cylindrical sealing surface 244 of the connector body 214. The O-ring 218 is disposed adjacent forwardmost radial annular surface 246, and is in abutting facing relation to the forward facing surface 294 of the seal retainer 217 to constrain it from moving axially rearward.

With the seal retainer so positioned, axial load imparted to seal member 218 by fluid pressure is transferred to seal member retainer 217. The O-ring 218 is urged against forward facing surface 294 of seal member retainer 217. Such axial forces cause the radial rear abutment surfaces 308 of legs 300 to abut radially directed annular seal member retaining surface 239.

The retainer 216 is releasably secured to connector body 214 by inserting free ends of arms 276 though entrance opening 232. As the arms 276 and retainer 216 are inserted into the entrance opening 232 of connector body 214, the top ramped surface 280 of each arm 276 contacts chamfer 234 and cylindrical surface 236 of rim 240 Insertion of the retainer 216 axially inward causes the arms 276 to flex radially inward relative to the ring 256 at the reduced diameter cylindrical portion 261. After the arms 276 of retainer 216 have been inserted into the retainer receiving portion 249 of the connector body 214, the arms 276 spring radially outward.

In its properly inserted position, the retainer 216 is constrained on the rim 240 of connector body 214. The cylindrical surface 236 and chamfer 242 of rim 240 reside in channel 265 of the retainer 216. The ring 256 is positioned outside of the entrance opening 232 of the bore 230 with forward facing surface 258 of the ring 256 disposed in facing relation to the outer planar surface 229 of the body 214 to limit the retainer 216 from further axial forward movement. The locking arms 276 are disposed within retainer receiving portion 249 of bore 230 with rear abutment surfaces 284 of the locking arms 276 abutting the radially directed annular abutment or locking surface 238 within retainer receiving portion 249 to prevent the retainer 216 from moving axially rearward. The retainer 216 thus releasably attached to body 214 at rim 240.

With the seal ring 218, seal retainer 217 and the retainer 216 inserted into the connector body 214, male member 212 may be inserted to create a fluid tight connection. As the male member 212 is inserted axially inward through entrance opening 232 the free end of male member 212 passes into bore 264 of retainer 216 and the inner bore 298 of the seal member retainer 217, and the inner bore of annular seal member 218. These components surround cylindrical surface 224 of tube 220. The upset 222 of the male member 212 contacts the bottom ramped surfaces 288 of the arms 276. Since the diameter of the upset 222 is greater than the diameter of portions of the bottom ramped surfaces 288, axially forward insertion of the male member 212 causes the arms 276 to spread radially outward. Once male member 212 has been sufficiently inserted axially inward for the upset 222 to surpass the arms 276, the arms 276 spring radially inward. The free end of the tube 220 is at this time positioned within and piloted by passage 252 of tube receiving portion 251 of body 214.

When so assembled a complete fluid coupling is achieved between tube 220 and component body 216. It is suitable for high pressure applications and can maintain a fluid seal even with high fluid pressure in the system such as an automotive brake system and even against frequent pressure pulsation within the system. For example, a brake system coupling assembly must withstand at least 5,000 pounds per square inch at a temperature of 257° F. (degrees Fahrenheit). The embodiment illustrated should withhold fluid pressures as high as 11,000 pounds per square inch.

Figure 7:
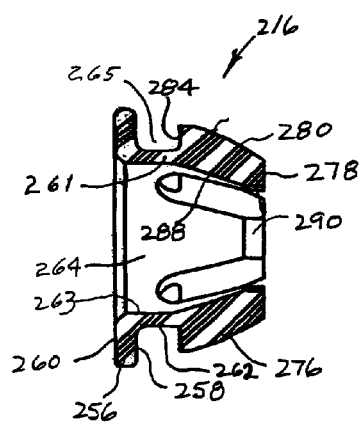
FIG. 7 is a cross-sectional view of the retainer of FIG. 6 taken along line 7-7 in FIG. 6.
Figure 6:
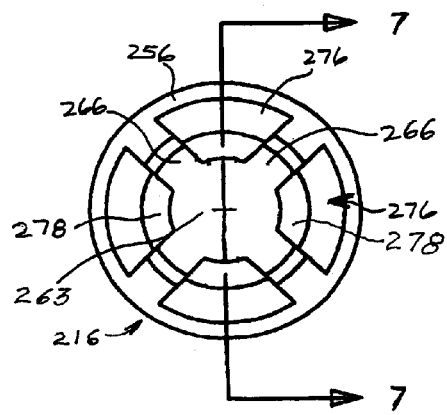
FIG. 6 is a front view of the retainer illustrated in FIG. 4.
Figure 8:
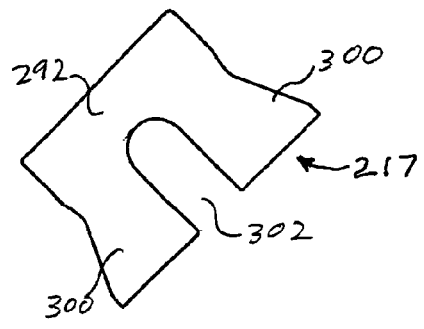
FIG. 8 is a perspective view of the spacer or separate seal member retainer of the embodiment of a fluid quick connector coupling illustrated in FIG. 1.
Figure 9:
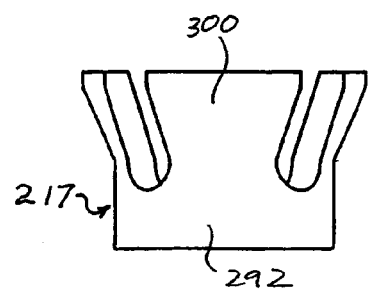
FIG. 9 is a side view of the seal member retainer illustrated in FIG. 8.
Figure 11:
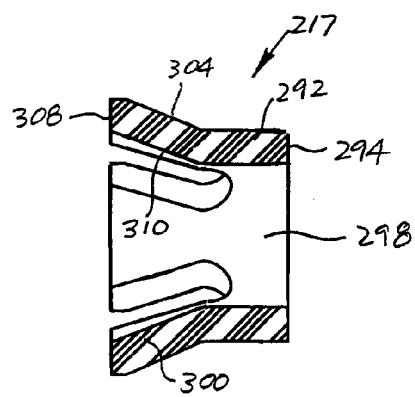
FIG. 11 is a cross-sectional view of the seal member retainer of FIG. 8 taken along line 11-11 of FIG. 10.
Figure 10:
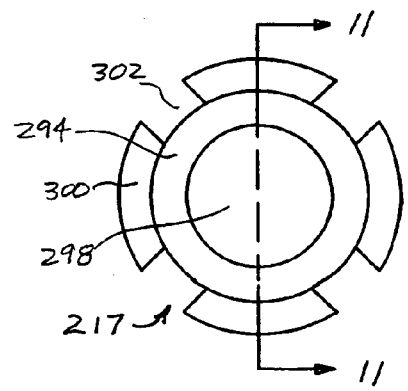
FIG. 10 is a front view of the seal member retainer illustrated in FIG. 9.

Referring to FIG. 7, the completed connector coupling assembly is maintained by the connection of the retainer 216 to the connector body 214. The retainer locking arms 276 are positioned with forward abutment surfaces 278 in abutting relation with rearward radial surface 223 of upset 222 of male member 212 and rearward abutment surfaces 284 in abutting relation with radial annular locking surface 238 within retainer receiving portion 249 of bore 232 of body 216. Bottom cylindrical surfaces 290 of each locking arm 276 rests on the cylindrical surface 224 of the male member 212.

O-ring seal 218 within seal receiving portion 250 surrounds cylindrical surface 224 of male member 212. The inner diameter of O-ring 218 seals against cylindrical surface 224 of male member 212 and the outer diameter of O-ring 218 seals against cylindrical sealing surface 244 of body 214.

Initiation of pressure within the fluid system urges the components within bore 230 rearward toward entrance opening 232. The axial force imparted to O-ring seal member 218 is delivered to connector body 214 by seal member retainer 217. Axial forces on O-ring 218 are delivered to forward facing abutment surface 294 of ring 292 of seal member retainer 217. Such loads are transferred to radially directed annular seal member retention surface 239 by rear abutment surfaces 308 of legs 300.

Pressurization of the system also imparts an axial force onto the tube 220 urging it rearward out of entrance opening 232. This axial load is also delivered to locking arms 278 of retainer 216 by upset 222 of tube 220.

As is well known disconnection of the tube 220 can be accomplished using a suitable release tool inserted along cylindrical surface 225 of tube 220. Such a tool has an annular shape with an outer surface having a diameter about the same as the diameter of upset 222 of tube 220. Insertion of the annular member into bore 264 of retainer 216 along tube surface 225 causes locking arms 276 to deform outwardly within retainer receiving portion 249 of bore 230. When arms 276 are sufficiently deformed radially outward, tube 220 may be withdrawn and upset 222 is free to pass rearward out of its connection with the retainer 216.

It is preferable that the retainer 216 and seal retainer 217 be molded of a polymeric material of sufficient strength, for example polyetheretherketone, also known as PEEK. A suitable PEEK for forming the retainer and/or seal retainer of the present invention is available under the trademark Victrex PEEK™ 450G.

Figure 12:
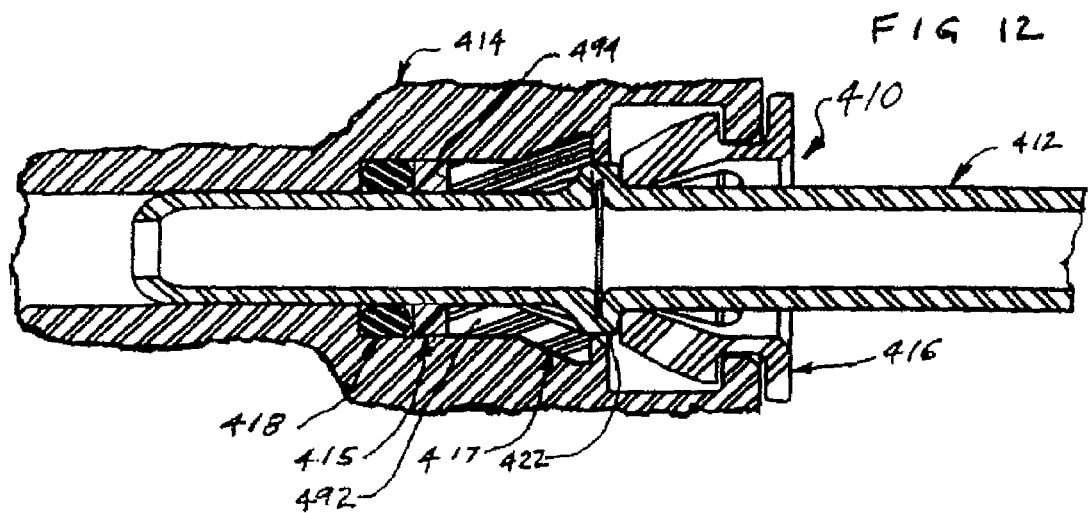
FIG. 12 is an alternative embodiment of the quick connector fluid coupling assembly of FIGS. 1-11.
Figure 13:
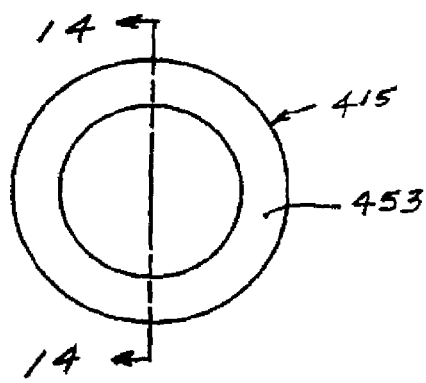
FIG. 13 is a front view of a spacer employed in the quick connector coupling assembly of FIG. 12.
Figure 14:
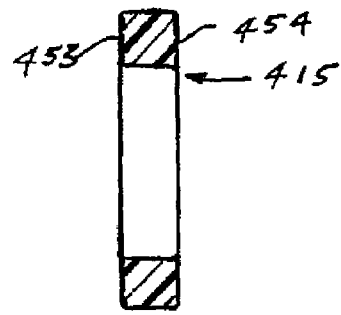
FIG. 14 is a sectional view of the spacer illustrated in FIG. 13 taken along the line 14-14 of FIG. 13.

Turning now to FIGS. 12-14, an alternative embodiment of the present invention is illustrated. In this embodiment the fluid coupling assembly 410 is essentially the same as that of the embodiment of FIGS. 1-11. It includes a hollow connector body 414 which is a component of a fluid system. The body includes a hollow bore that is the same as bore 230 that of the connector body 214 of the previous embodiment.

A male member 412 defined by tube with an upset 422 is releasably secured within the bore of body 414 by a retainer 416 which is essentially the same as retainer 216 of the previous embodiment.

A seal member in the form of an O-ring 418 provides a fluid tight seal between a sealing surface within the bore of the body 414 and an outer cylindrical surface of male member 412.

A seal member retainer 417 retain the O-ring seal within the bore of body 414. It includes a ring 492 with a forward radially directed annular abutment surface 494 and four spaced apart rearward and radially outwardly directed legs that define rearward abutment surfaces that abut a radial annular surface within the bore of body 414 to retain the O-ring 418.

In this embodiment, a spacer 415 is interposed between forward radially directed annular abutment surface 494 of ring 492 of seal member retainer 417 and seal member 418. As best seen in FIGS. 13 and 14, spacer 415 is an annular ring of generally rectangular cross-section. It is made of Polytetrafluorethelene (PTFE) or Teflon (Teflon is a registered trademark of DuPont). It may also be filled with about 13 percent graphite in the Teflon material. It has a forward facing annular surface 453 and a rearward facing annular surface 454. Surface 453 defines a radial seat surface for O-ring 418. When fluid pressure exists in the system, the O-ring is urged against forward facing annular surface 453. Rearward facing annular surface 454 is a radial abutment surface that abuts against forward facing abutment surface 494 of ring 492 of seal member retainer 417. Such axial load is transferred to body 414 by the legs of seal member retainer 417.

Various features of the present invention have been described with reference to the above illustrative embodiments. It should be understood that modifications may be made without departing from the spirit and scope of the invention as represented by the following claims.

I claim:

1. A fluid coupling assembly comprising:
    a connector body defining a tube receiving bore extending axially from an entrance opening defined by a radially inward extending rim, said connector body further including a radially inward extending annular rib within said bore axially forward of said body defining a retainer receiving portion between said rim and said rib, and a cylindrical sealing surface forward of said rib;
    a retainer releasably secured to said connector body, said retainer including a plurality of axially extending arms, each said arm including a rear abutment surface, said rear abutment surfaces in abutting relation with said rim;
    a seal member disposed in said bore contacting said cylindrical sealing surface in said bore of said connector body, said sealing member located axially forward of said annular rib; and
    a separate seal member retainer disposed within said bore between said seal member and said rib including a ring slidable relative to said body having a forward facing abutment surface and a plurality of legs extending axially rearwardly and radially outwardly from said ring, each said leg including a rear abutment surface in abutting relation with said annular rib, the axial extent of said seal member retainer being from said forward abutment surface to said rear abutment surfaces of said legs.

2. A fluid coupling assembly as claimed in claim 1 wherein said rib of said body includes a forward facing radially extending annular seal member retention surface and further defines a conical surface extending forward from said radially extending annular seal member retention surface that merges with said cylindrical sealing surface, and said legs of said seal member retainer are disposed in closely spaced facing relation to said conical surface with said rear abutment surfaces in abutting relation to said radially extending annular seal member retention surface.

3. A fluid coupling assembly as claimed in claim 2 wherein said cylindrical sealing surface of said body surrounds said ring of said seal member retainer in closely spaced relation.

4. The fluid coupling assembly of claim 3 wherein said seal member is an O-ring.

5. A fluid coupling assembly as claimed in claim 3 wherein said assembly includes a hollow tube disposed in said bore, said tube having a cylindrical surface extending from its free end slidable in said ring of said seal member retainer and a radially directed upset spaced from its free end, said plurality of arms of said retainer each including a forward abutment surface in abutting relation to said upset.

6. A fluid coupling assembly as claimed in claim 5 wherein said seal member and said seal member retainer are disposed in surrounding relation to said cylindrical surface of said tube intermediate said free end and said upset.

7. The fluid coupling assembly of claim 2 wherein said seal member is an O-ring.

8. A fluid coupling assembly as claimed in claim 2 wherein said assembly includes a hollow tube disposed in said bore, said tube having a cylindrical surface extending from its free end slidable in said ring of said seal member retainer and a radially directed upset spaced from its free end, said plurality of arms of said retainer each including a forward abutment surface in abutting relation to said upset.

9. A fluid coupling assembly as claimed in claim 8 wherein said seal member and said seal member retainer are disposed in surrounding relation to said cylindrical surface of said tube intermediate said free end and said upset.

10. The fluid coupling assembly of claim 1 wherein said seal member is an O-ring.

11. A fluid coupling assembly as claimed in claim 10 and said assembly includes an annular ring made of polytetrafluoroethelene including a forward facing annular surface defining a radial seat surface for said O-ring and a rearward facing annular surface for abutting relation to said forward facing abutment surface of said ring of said seal member retainer interposed between said O-ring and said forward abutment surface of said ring of said seal member retainer.

12. The fluid coupling assembly of claim 1 wherein said retainer further includes a ring, said aims extend axially forward from said ring, and a portion of said ring is disposed outside of said connector body at said entrance opening.

13. A fluid coupling assembly as claimed in claim 1 wherein said assembly includes a hollow tube disposed in said bore, slidable in said ring of said seal member retainer, said tube having a cylindrical surface extending from its free end and a radially directed upset spaced from its free end, said plurality of arms of said retainer each including a forward abutment surface in abutting relation to said upset.

14. A fluid coupling assembly as claimed in claim 13 wherein said seal member and said seal member retainer are disposed in surrounding relation to said cylindrical surface of said tube intermediate said free end and said upset.

15. The fluid coupling of claim 1 wherein said retainer is formed of polyetheretherketone.

16. The fluid coupling of claim 1 wherein said seal member retainer is formed of polyetheretherketone.

17. A fluid coupling assembly as claimed in claim 1
said rim including a radially directed annular locking surface forward of said entrance opening, within said retainer receiving portion;
said retainer releasably secured to said connector body having a portion outside said tube receiving bore at said entrance opening and a portion within said retainer receiving portion of said bore, said rear abutment surfaces, in abutting relation to said radially directed annular locking surface of said rim within said retainer receiving portion of said bore.

18. A fluid coupling assembly as claimed in claim 17 wherein a hollow tube is disposed within said bore of said body, said tube including a radial upset spaced from its free end and said locking arms includes a front abutment surface in abutting relation to said upset of said tube.

19. A fluid coupling assembly as claimed in claim 17 wherein said retainer includes a cylindrical ring defining a forward facing radial surface and a reduced diameter cylindrical portion and wherein said locking arms are separated by slots and extend axially forward from said reduced diameter cylindrical portion.

20. A fluid coupling assembly as claimed in claim 19 wherein a hollow tube is disposed within said bore of said body said tube including a radial upset spaced from its free end and said locking arms each include a front abutment surface in abutting relation to said upset of said tube.

21. A fluid coupling assembly as claimed in claim 19 wherein said slots between said locking arms extend into said reduced diameter cylindrical portion.

22. A fluid coupling assembly as claimed in claim 21 wherein said forward facing radial surface and said reduced diameter cylindrical portion of said ring and said rear abutment surfaces of said locking arms define a channel, and wherein said rim of said connector body is disposed in said channel.

23. A fluid coupling assembly as claimed in claim 22 wherein a hollow tube is disposed within said bore of said body said tube including a radial upset spaced from its free end and said locking arms each include a front abutment surface in abutting relation to said upset of said tube.

24. A fluid coupling assembly as claimed in claim 21 wherein a hollow tube is disposed within said bore of said body said tube including a radial upset spaced from its free end and said locking arms each include a front abutment surface in abutting relation to said upset of said tube.

* * * * *

UNITED STATES PATENT AND TRADEMARK OFFICE
CERTIFICATE OF CORRECTION

| | |
|---|---|
| PATENT NO. | : 7,488,005 B2 |
| APPLICATION NO. | : 11/218666 |
| DATED | : February 10, 2009 |
| INVENTOR(S) | : Stephen H. Gunderson |

Page 1 of 1

It is certified that error appears in the above-identified patent and that said Letters Patent is hereby corrected as shown below:

<u>Claim 1 Col. 7</u>,
Line 50, after "of said", insert --rim, said--

<u>Claim 12 Col. 8</u>,
Line 54, change "aims" to --arms--

Signed and Sealed this

Thirty-first Day of March, 2009

JOHN DOLL
*Acting Director of the United States Patent and Trademark Office*